(12) United States Patent
Fiat

(10) Patent No.: US 7,840,216 B2
(45) Date of Patent: Nov. 23, 2010

(54) METHOD FOR ENHANCED HANDOVER DETECTION FOR MOBILE NETWORKS, A MOBILE TERMINAL, AN ACCESS POINT AND PROGRAM MODULES THEREFOR

(75) Inventor: Lionel Fiat, Boulogne Billancourt (FR)

(73) Assignee: Alcatel, Paris (FR)

( * ) Notice: Subject to any disclaimer, the term of this patent is extended or adjusted under 35 U.S.C. 154(b) by 184 days.

(21) Appl. No.: 11/233,111

(22) Filed: Sep. 23, 2005

(65) Prior Publication Data
US 2006/0088005 A1 Apr. 27, 2006

(30) Foreign Application Priority Data
Oct. 26, 2004 (EP) .................................. 04292544

(51) Int. Cl.
*H04W 36/00* (2009.01)
*H04W 4/00* (2009.01)
*H04L 12/403* (2006.01)

(52) U.S. Cl. ..................... 455/436; 455/437; 455/438; 455/439; 370/331; 370/449

(58) Field of Classification Search ................ 370/331, 370/449; 455/436–439
See application file for complete search history.

(56) References Cited

U.S. PATENT DOCUMENTS

| | | | |
|---|---|---|---|
| 5,778,075 A | 7/1998 | Haartsen | |
| 6,070,075 A * | 5/2000 | Kim | 455/437 |
| 6,157,820 A * | 12/2000 | Sourour et al. | 455/226.2 |
| 6,278,877 B1 * | 8/2001 | Brederveld et al. | 455/434 |
| 6,366,778 B1 * | 4/2002 | Bender et al. | 455/442 |
| 2004/0156399 A1 * | 8/2004 | Eran | 370/913 |
| 2004/0165563 A1 | 8/2004 | Hsu et al. | |
| 2004/0246922 A1 * | 12/2004 | Ruan et al. | 370/331 |
| 2005/0136914 A1 * | 6/2005 | van Kampen et al. | 455/426.2 |
| 2006/0092900 A1 * | 5/2006 | Lewis | 370/338 |
| 2006/0135066 A1 * | 6/2006 | Banerjea | 455/41.2 |

FOREIGN PATENT DOCUMENTS

EP 1 328 087 A1 7/2003

\* cited by examiner

*Primary Examiner*—Vincent P Harper
*Assistant Examiner*—Marisol Figueroa
(74) *Attorney, Agent, or Firm*—Sughrue Mion, PLLC

(57) ABSTRACT

The invention concerns a method for determining the appropriate moment for carrying out a handover of a connection of a mobile terminal in a mobile network whereby if no user related data or no probe data have been sent for a certain time interval from an access point to the mobile terminal, probe data are sent from the access point to said mobile terminal and/or if no user related data or no probe data have been sent for a certain time interval from said mobile terminal to said access point, probe data are sent from the mobile terminal to said access point, a mobile terminal, an access point and program modules therefor.

9 Claims, 1 Drawing Sheet

METHOD FOR ENHANCED HANDOVER DETECTION FOR MOBILE NETWORKS, A MOBILE TERMINAL, AN ACCESS POINT AND PROGRAM MODULES THEREFOR

The invention is based on a priority application EP 04 292 544.6 which is hereby incorporated by reference.

TECHNICAL FIELD

The invention relates to a method for determining the appropriate moment for carrying out a handover of a connection of a mobile terminal in a mobile network from an access point to another access point, a mobile terminal for communicating within a mobile network comprising access points, an access point for communicating within a mobile network comprising at least one mobile terminal and program modules to be executed in a mobile terminal for communicating within a mobile network comprising access points and to be executed in an access point for communicating within a mobile network comprising at least one mobile terminal.

BACKGROUND OF THE INVENTION

The WLAN standards IEEE 802.11a/b/g are experiencing a successful development. This success is mainly based upon the use of these standards in enterprise networks, hot spots and at home, i.e. conference centers, railway stations, airports, hotels and so on. In these environments, Voice over Internet Protocol (VoIP) and Voice over WLAN (VoWLAN) are becoming attractive technologies with the main goal to reduce the communication costs by merging data and voice networks.

Offering real time handover is an essential requirement for VoWLAN and other real time services like video conferences and therefore the handover between two WLAN access points is an active subject of research because the handover time has to be drastically reduced in order to allow VoWLAN seamless mobility between two IEEE 802.11 access points.

The first handover phase consists in detecting as fast as possible whether a handover has to be carried out. The IEEE 802.11 standard e.g. only enables quite slow passive handover detection based on a so-called access point traffic or beacon listening, i.e. a mobile terminal detects a bad radio link quality with its current access point, which means that a handover has to be carried out, by means of power measurements of the user related traffic or beacon frames. In a WLAN network applying the IEEE 802.11 standard, data that are called beacon are more or less periodically broadcasted from an access point marking the beginning of a contention-free transaction period and enabling synchronization of all devices within the WLAN network with a time period called beacon interval, which has typically the length of 100 ms in case of current WLAN deployments. About data that are called user related traffic frame, no known interval can be considered, the interval depends on the traffic of the application.

Thus in case no data except this beacon is used for power measurements, the latency for the detection of the necessity of a handover will be in the range of 100 ms which does not offer an acceptable quality for real-time applications.

By means of power measurements of user related data that are exchanged between a mobile terminal and an access point, this detection procedure can be speeded up, but if no user related data are exchanged between a mobile terminal and an access point for a longer time, no power measurements can be performed and the detection whether a handover is necessary occurs quite late. As a consequence the handover procedure is quite long and real time services such as VoWLAN during mobility will be degraded.

The same problem as described above of course also occurs in other mobile networks than WLAN networks, e.g. in Global System for Mobile Communication (GSM) networks, as here user related data are exchanged e.g. over the traffic channel (TCH) between a mobile terminal and an access point, here called Base Transceiver Station (BTS), and these user related data are used for power measurements.

SUMMARY OF THE INVENTION

The object of the invention is to propose a solution for fast determination of the appropriate moment for carrying out a handover by means of allowing for more frequent power measurements.

This object is achieved by a method according to the teaching of claim 1, a mobile terminal according to the teaching of claim 4, an access point according to the teaching of claim 6 and program modules according to the teaching of claims 5 and 7.

The main idea of the invention is to exchange additional data, e.g. probe data like the so-called Null frames, between an access point and a mobile terminal if no data have been exchanged between the access point and the mobile terminal for a certain time interval. Thus the pauses between the power measurements that are used for the detection of the necessity of a handover will be drastically reduced and as a consequence this detection can be performed much faster. The allowed maximum length of the time interval in which no data are exchanged between the access point and the mobile terminal before additional data are exchanged depends on the maximum allowed time for the detection of the necessity of a handover that does not lead to a degradation of the quality of real-time services.

To provide the features according to the invention, either the mobile terminal or the access point can send these additional data after the time interval has elapsed, and small modifications concerning the program modules of the mobile terminal and the access point respectively have to be performed for this purpose.

In a IEEE 802.11 cell e.g., as already mentioned a beacon is typically sent every 100 ms and in case the mobile terminal is sending VoWLAN traffic data, this traffic data framing has preferably a length of 10, 20 or 30 ms, but no frame may be sent if the VoWLAN codec manages silent mode. With a traffic data framing of 20 ms, the solution could consist in sending a Null frame systematically if no user data traffic has been sent since more than 30 ms, but depending on the time requirements for detection of the necessity of a handover this value could also be smaller than the traffic data framing length.

As a trade-off for the faster detection of the necessity of a handover, the application of the invention decreases the maximum number of mobile terminals in a cell that can simultaneously send VoWLAN traffic data, as the VoWLAN traffic estimation considers the VoWLAN traffic activity rate which is increased by the additional data.

The invention can also be applied in other mobile networks than WLAN networks, e.g. in GSM networks, as there the data that are exchanged between the mobile terminal and the access point e.g. over the traffic channel (TCH) are as well used to perform power measurements. As in times in which no data are exchanged, the amplifiers of the radio transmitters are switched off, the exchange of additional data allows of performing power measurements more frequently.

Further developments of the invention can be gathered from the dependent claims and the following description.

BRIEF DESCRIPTION OF THE DRAWINGS

In the following the invention will be explained further making reference to the attached drawing.

A mobile network in which the invention can be implemented comprises at least two access points and at least one mobile terminal.

Figure 1:
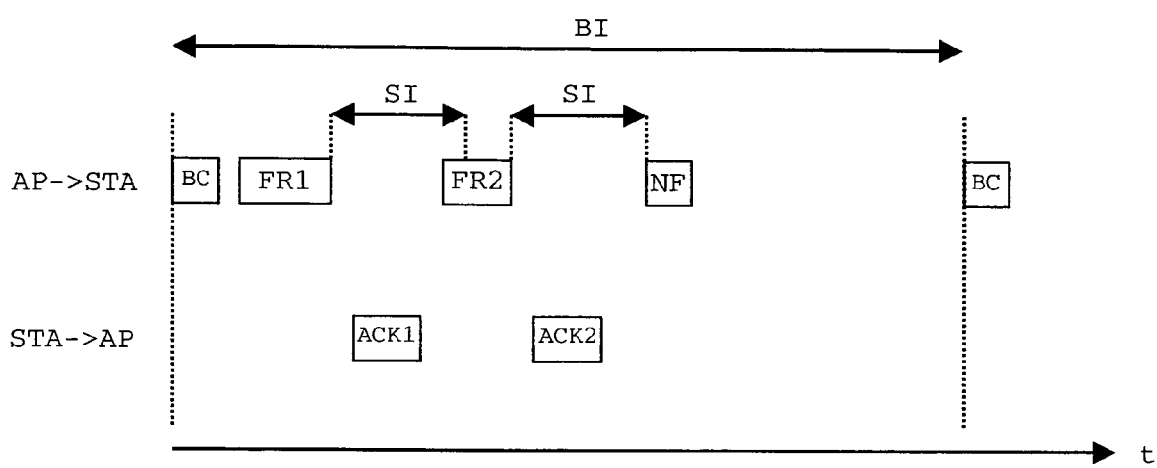

The access points are all connected to each other via a backbone system and at least one mobile terminal STA is connected to at least one access point AP via a wireless connection. The mobile terminal STA that is connected via a wireless connection to the access point AP can by means of the backbone system be further connected to another mobile terminal within the same mobile network. Furthermore, this mobile terminal STA can also be connected by means of the backbone system and via gateways to devices like e.g. terminals or servers located in further networks like e.g. the Internet or another mobile network.

The access point AP comprises the functionality of an access point of a mobile network, i.e. it provides the possibility for mobile terminals to get connected to a mobile network. Furthermore, according to the invention the access point AP comprises means for sending probe data NF to the mobile terminal STA if no user related data FR1, FR2, ACK1, ACK2 or no probe data NF have been sent from the access point AP to the mobile terminal STA for a certain time interval SI.

The mobile terminal STA comprises the functionality of a mobile terminal for a mobile network, i.e. it can be connected to a mobile network by means of the access point AP. Additionally, the mobile terminal STA comprises means for sending probe data NF to the access point AP if no user related data FR1, FR2, ACK1, ACK2 or no probe data NF have been sent from the mobile terminal STA to the access point AP for a certain time interval SI.

In the following, by way of example the method according to the invention is described in detail making reference to FIG. 1.

DETAILED DESCRIPTION OF PREFERRED EMBODIMENTS

FIG. 1 schematically shows the data transfer according to one embodiment of the invention between the access point AP and the mobile terminal STA both belonging to the same mobile network and with the mobile terminal STA being connected to the access point AP. Said data transfer scheme is used in order to perform a method for determining the appropriate moment for carrying out a handover according to the invention.

The data transfer scheme depicted in FIG. 1 shows in the upper row the data packets sent from the access point AP to the mobile terminal STA and in the lower row the data packets sent from the mobile terminal STA to the access point AP both plotted against the timeline t.

The access point AP preferably performs the transmission of data to the mobile terminals STA in more or less periodic time intervals called beacon intervals BI. The time span of such a beacon interval BI is depicted in FIG. 1 by the large double arrow. At the beginning of such a beacon interval BI, the access point AP broadcasts a beacon frame BC which is a management frame that maintains the synchronization of the timers in the mobile terminals and delivers protocol related parameters. As the beacon frame is broadcasted from the access point AP and received by every mobile terminal that is within the coverage of the radio link of this access point AP, every mobile terminal within the coverage of the radio link of this access point AP has the opportunity to perform power measurements at least once within a beacon interval BI by measuring the power of the received beacon frame BC. By using these measurements, the decision whether a handover to another access point is necessary can be made at the beginning of each beacon interval BI by comparing the measurements with certain threshold values. Thus, in case of VoWLAN traffic data, this decision can be made at least every 100 ms, as the beacon interval for VoWLAN traffic data has typically the length of 100 ms.

After broadcasting of the beacon frame BC, it preferably follows a space of time of a certain length in order to trigger different transmission procedures. In FIG. 1 it is shown that after a certain pause user related data FR1 are sent from the access point AP to the mobile terminal STA comprising data like e.g. voice data for said mobile terminal STA and/or polling data for said mobile terminal STA to ask for data that are pending in said mobile terminal STA.

After reception of the user related data FR1 and another pause, the mobile terminal STA responds to the access point AP through sending further user related data ACK1 comprising e.g. an acknowledgement to the access point AP.

The access point AP in turn sends additional user related data FR2 comprising e.g. the sequel to the user related data FR1 to the mobile terminal STA after a pause has elapsed.

Again, like after the reception of the user related data FR1, the mobile terminal STA acknowledges the reception of the user related data FR2 after a pause through sending user related data ACK2 to the access point AP.

All the data that the mobile terminal STA receives, like e.g. the user related data FR1 and FR2, can be used by the mobile terminal STA to perform power measurements in order to decide on the necessity of a handover. In the example described by use of FIG. 1, the certain time interval SI representing the maximum time span that can be tolerated without performing power measurements is depicted by the two small double arrows. If no data have been sent from the access point AP to the mobile terminal STA for more than the time span SI, the access point AP sends probe data NF like e.g. Null frames to allow for power measurements by the mobile terminal STA.

As no more data are pending now in the access point AP to be sent to the mobile terminal STA, it is shown in FIG. 1 that after elapsing of the certain time interval SI, the access point AP sends such probe data NF to the mobile terminal STA. Sending of probe data NF did not occur between the sending of the user related data FR1 and FR2, as the certain time interval SI did not elapse between the end of sending the user related data FR1 and the beginning of sending the user related data FR2.

In the example described by use of FIG. 1, the procedure of sending probe data NF from the access point AP to the mobile terminal STA after elapsing of the certain time interval SI repeats till either user related data have to be sent to the mobile terminal STA or the end of the beacon interval is reached.

When the beacon interval BI has elapsed, a new beacon interval begins with sending of a beacon frame BC.

In a preferred embodiment of the invention, the access point AP determines the certain time interval SI that can be tolerated without performing power measurements taking into account the so-called traffic classes defined e.g. in the 802.11e standard, i.e. the priority the data packets FR1 and FR2 are assigned to.

In another embodiment of the invention, it is not the access point AP, but the mobile terminal STA that initiates the sending of probe data NF like e.g. Null frames if no data have been sent from the mobile terminal STA to the access point AP for more than the certain time interval SI. In this case, power measurements can be performed by the access point AP.

At least one of the power measurements performed in the mobile terminal STA and/or in at least one access point can be taken into account to decide whether or not a handover of the connection has to be performed. This decision to perform a handover can be taken e.g. by the mobile terminal STA or at least one access point.

The invention claimed is:

1. A method for determining the appropriate moment for carrying out a handover of a connection of a mobile terminal in a mobile network from a first access point to another access point by means of allowing for more frequent power measurements, comprising:
   determining, by said first access point, whether user related data and probe data have not been sent for a certain time interval from said first access point to said mobile terminal and, if user related data and probe data have not been sent for the certain time interval from said first access point to said mobile terminal, sending, by said first access point, probe data from said first access point to said mobile terminal;
   wherein said mobile terminal uses said probe data sent by said first access point to perform power measurements used for detection of the necessity of the handover of said connection of the mobile terminal from the first access point to another access point.

2. The method of claim 1, further comprising:
   determining, by said mobile terminal, whether user related data and probe data have not been sent for a certain time interval from said mobile terminal to said first access point and, if user related data and probe data have not been sent for the certain time interval from said mobile terminal to said first access point, sending, by said mobile terminal, probe data from said mobile terminal to said first access point;
   wherein said first access point uses said probe data sent by said mobile terminal to perform power measurements used for detection of the necessity of the handover of said connection of the mobile terminal from the first access point to another access point.

3. A method according to claim 2, wherein said sending of probe data from said first access point to said mobile terminal is initiated through sending said probe data from the mobile terminal to said first access point.

4. A method according to claim 2, wherein said first access point determines the certain time interval taking into account the traffic classes of the user related data that are exchanged between said first access point and said mobile terminal.

5. A method according to claim 2, wherein said sending of probe data from said first access point to said mobile terminal is initiated when a mobile terminal does not receive or transmit data during a certain period of time.

6. The method of claim 1, wherein the probe data is comprised of null frames.

7. A method for determining the appropriate moment for carrying out a handover of a connection of a mobile terminal in a mobile network from a first access point to another access point by means of allowing for more frequent power measurements, comprising:
   determining, by said mobile terminal, whether user related data and probe data have not been sent for a certain time interval from said mobile terminal to said first access point and, if user related data and probe data have not been sent for the certain time interval from said mobile terminal to said first access point, sending, by said mobile terminal, probe data from said mobile terminal to said first access point;
   wherein said first access point uses said probe data sent by said mobile terminal to perform power measurements used for detection of the necessity of the handover of said connection of the mobile terminal from the first access point to another access point.

8. A mobile terminal for communicating within a mobile network comprising access points and for fast determination of the appropriate moment for carrying out a handover of a connection of a mobile terminal in a mobile network from a first access point to another access point by means of allowing for more frequent power measurements, said mobile terminal comprising:
   means for determining whether user related data and probe data have not been sent for a certain time interval from said mobile terminal to said first access point and, if user related data and probe data have not been sent for the certain time interval from said mobile terminal to said first access point, sending, by said mobile terminal, probe data from said mobile terminal to said first access point;
   wherein said probe data sent by said mobile terminal are used to perform power measurements, thus allowing the performance of more frequent power measurements that are used for detection of the necessity of the handover of said connection of the mobile terminal from the first access point to another access point.

9. A first access point for communicating within a mobile network comprising at least one mobile terminal and for fast determination of the appropriate moment for carrying out a handover of a connection of a mobile terminal in a mobile network from a first access point to another access point by means of allowing for more frequent power measurements, said access point comprising:
   means for determining whether user related data and probe data have not been sent for a certain time interval from said first access point to said mobile terminal and, if user related data and probe data have not been sent for the certain time interval from said first access point to said mobile terminal, sending probe data from said first access point to said mobile terminal;
   wherein said probe data sent by said first access point are used to perform power measurements, thus allowing the performance of more frequent power measurements that are used for detection of the necessity of the handover of said connection of the mobile terminal from the first access point to another access point.

* * * * *